J. D. GOODWIN.
SAFETY RAZOR.
APPLICATION FILED AUG. 26, 1919.
Reissued Nov. 11, 1919. 14,748.
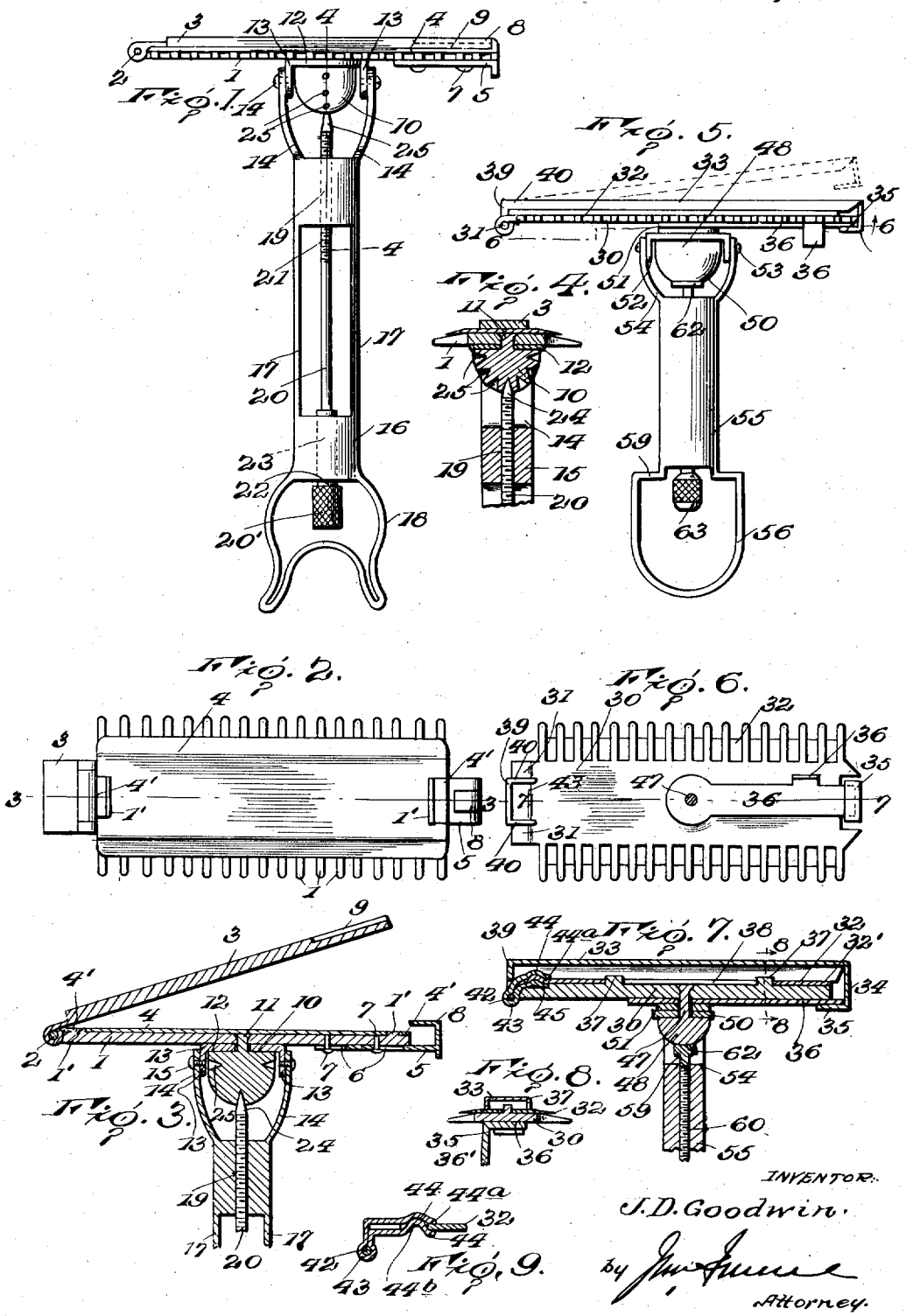

UNITED STATES PATENT OFFICE.

JAMES D. GOODWIN, OF RICHMOND, VIRGINIA.

SAFETY-RAZOR.

14,748. Specification of Reissued Letters Patent. Reissued Nov. 11, 1919.

Original No. 1,290,018, dated December 31, 1918, Serial No. 230,762, filed April 25, 1918. Application for reissue filed August 26, 1919. Serial No. 320,017.

*To all whom it may concern:*

Be it known that I, JAMES D. GOODWIN, a citizen of the United States, residing at Richmond, in the county of Henrico and State of Virginia, have invented a new and useful Safety-Razor, of which the following is a specification.

The invention relates to an improvement in safety-razors, being directed more particularly to certain parts of an invention described in an application of Landon H. Stephenson and James D. Goodwin, the applicant herein, which application was filed January 15, 1915, and serially numbered 4245.

The present invention provides means for so connecting the handle of the razor, to the blade-carrying member, that a variety of relative adjustments of such handles and member may be conveniently provided, to dispose the blade in such member at substantially any desired angular relation to the handle, to thereby accommodate individual requirements. The invention also contemplates means for holding the blade between the guard and clamping plate to facilitate the application and removal of the blade.

The invention, structurally considered, consists in swiveling the handle relative to the blade carrying member through a combined rotary and pivotal mounting, and providing coöperating means for locking the parts in such relative adjustments.

In the drawings:—

Figure 1 is a side elevation of one form of my improved razor;

Fig. 2 is an end view of said improved form of razor looking toward the blade end with the clamping plate open and fragmentarily shown;

Fig. 3 is a cross sectional view on the line 3—3 of Fig. 2, through the complete razor but with the clamping plate partly open;

Fig. 4 is a cross sectional view on the line 4—4 of Fig. 1;

Fig. 5 is a side elevation;

Fig. 6 is a cross sectional view on the line 6—6 of Fig. 5;

Fig. 7 is a fragmentary cross sectional view taken on the line 7—7 of Fig. 6 through the complete razor;

Fig. 8 is a cross sectional view on the line 8—8 of Fig. 7, and

Fig. 9 is an enlarged sectional view of the blade carrier of the modified form of safety razor.

The invention is here shown as embodying distinct form of the invention and in that illustrated in Figs. 1 to 4, inclusive, the structure includes a guard-plate 1, of any usual or preferred type, to which at one end is pivotally connected, at 2, a clamping plate 3. The blade 4 is to be secured between the guard and clamping plate, and such parts may be formed to directly coöperate or engage with the blade, as for example, in the provision of end notches 4′ in the blade to receive lugs 1′ integral with the guard plate. A locking plate 5, here shown as having a slidable connection with the guard plate, as by pins 7 and slots 6, has the outer end formed to provide an offset locking lug 8, to overlie and engage the upper surface of the non-pivotal end of the clamping plate 3, to hold the latter in clamping relation to the guard plate to secure the blade between them.

A characteristic and important feature of the present invention resides in the adjustable and locking connection between the guard plate and handle. This structure, as here shown, comprises a head 10 of substantially semi-spherical form, fixed to the guard plate by a stud 11, and between the plain upper surface of the head and the guard plate, there is arranged on the stud 11 as a pivot a swivel plate 12, having diametrically opposed depending ears 13.

The handle 14 is shown as of skeleton form having upper and lower block-like portions 15 and 16, connected by bars or rods 17. The arms 17 extend above the upper block 15 and are somewhat bowed and terminally and pivotally secured to the ears 13, as by removable screw connections 14′. The arms 17 also extend below the lower block and are formed into an ornamental grip-terminal 18.

A locking rod 20 is mounted in the handle, having a knurled operating head 20′ disposed below the block 16 of the handle, and the relatively upper portion threaded as at 21, to coöperate with a threaded opening 19, in block 15 of the handle. The locking rod has an enlarged bearing portion 22 slidably and rotatably mounted in a plain bore bearing opening 23 in the block 16.

The upper terminal of the locking rod is pointed or substantially tapered, as at 24 to coöperate with any one of a series of openings 25 formed in the head 10, which openings are designed to be arranged in any desired configuration in the head. As here shown the openings are in rows at right angles to each other, but any desired arrangement is of course contemplated.

In this form the heads may be secured in place by obvious operation of the looking plate, a single movement being alone necessary in either securing or releasing the blade. With the locking rod retracted, as by unscrewing, the blade-carrying portion of the razor may be adjusted at substantially any angle with relation to the handle, whereupon, a severing movement of the locking rod, to cause its engaging end 24 to enter the then alined opening 25 in the head 10, secures the blade-carrying member in the desired adjustment to the blade.

In Figs. 5 to 9, there is shown a somewhat different structure of blade-securing means and of the handle locking adjustment, though the principle involved is the same as in the preferred form.

In the detail shown in these figures, a guard plate 30 is provided at one end with spaced pintles 31. A clamping plate 33 is pivotally connected with the guard plate, being provided with an angled end 39 having ears 40 to be pivotally connected with the pintle 31, by a pivot pin 42. In this form the blade 32 is shown as formed with a longitudinal slot 38 to receive lugs 37 projecting from the guard plate, to properly and relatively position the parts. The clamping plate has depending flanges to overlie and bear on the blade 32, when the parts are in clamping position, and at the end opposite its hinged support said clamping plate has a locking member in the form of an extension 32′, having an end wall 34 with an inwardly-extending terminal lip 35 to underlie the guard plate when the parts are in clamping position. A latch 36 is pivotally supported on a stud 47 depending from the guard plate, the free end of the latch being operable to and from coöperation with the lip 35 to secure and free the parts, as will be obvious.

The blade 32 is held in a retaining clip, whereby it is conveniently applied or removed, and whereby the blade is initially held for convenient and proper application to the guard plate. This clip comprises spring plates 44 arranged in superimposed relation and having a terminal eye to receive the pivot pin 42. These plates are formed for interfitting connection, as by a projection $44^b$ and a socket $44^a$ in the other, and the blade 32 has an end notch 32′ to be embraced by the connection described, whereby to temporarily hold the blade in such clip. The plates 44 are so mounted on the pivot pin 42 as to have a normal spring tendency from the guard plate, and the overlying portion of the clamping will engage the clip and force the latter to lower position as the clamping plate is moved to holding position. As the blade is removably held by the clip it is apparent that in removing the blade, the freeing of the latch connected end of the clamping plate will permit such end to be moved upwardly, during which movement the spring clip carrying the blade will move correspondingly for a limited distance. This elevates the blade from the lugs 37 of the guard plate and positions it free of and between the clamping and guard plates, in a position to be conveniently grasped. The application of a blade is correspondingly facilitated by the clip, as when held in the latter such blade is positioned to coöperate with the guard plate when the clamping plate is forced to clamping position.

The locking means for holding the handle and blade holder in position of relative adjustment is also somewhat modified in the type being described, the mounting being, however, substantially similar to that of the preferred form. Such mounting comprises a semi-spherical head 48 fixed on or integral with stud 47, on which stud between the head and guard plate is arranged a swivel plate 50 having depending ears 52, a washer 51 being preferably interposed between the plate 50 and the guard plate.

A handle includes a block 55 with open end 56 and arms 54, bowed and pivotally connected to the ears 52, as by removable screw-pins 53. A locking rod 59 has threaded connection at 60, with the bore 61 of the handle block 55, said rod having an operating end 63. The end of said rod adjacent the head 48 has a friction-clutch plate 62 shaped to correspond to the external shape of such head 48.

Obviously the blade holder and handle may be removed to any appropriate relative positions, and locked in such adjustment by operating the rod 59 through its threaded mounting in the block 55 to frictionally hold such head 48 through the plate 62.

What is claimed as new is:—

1. A safety razor including a blade holder comprising a guard plate and a clamping plate between which the blade is secured, a spring clip mounted on the guard plate and comprising a pair of plates between which the blade fits, the spring clip being positioned to be engaged by the clamping plate to put said clip under tension in the clamping movement of the clamping plate, whereby in the opening movement of such clamping plate the clip serves to elevate the blade from the guard plate.

2. An edge tool having a holder, a handle therefor, said handle having separate arms at one end, a swivel having ears to which said arms are pivoted, a head, said swivel being supported by said head and a screw-rod having threaded connection with said handle with one end adapted to engage said head, and the opposite end formed to permit manipulation of the rod.

3. A safety razor comprising a blade holder having a depending head formed with a plurality of depressions, a swiveled plate interposed between the blade holder and the head and held in position by the latter, said plate having depending ears, a handle member provided at one end with spaced apart ears which register with the ears on the plate alined pivots connecting the ears, on opposite sides of the head, the handle member having a threaded opening, and a screw extending through and engaging the threads in the opening, the end of the screw being pointed and engaging one of the indentations to lock the handle member and holder in adjusted position.

4. A safety razor comprising a blade holder, a handle member having spaced arms at one end, a swivel having ears to which said arms are pivoted, a head supporting the swivel, and a screw having threaded connection with said handle member with one end adapted to engage the head to lock the blade holder and handle member in adjusted position.

5. A safety razor comprising a blade holder, a semi-spherical head having a reduced extension which is mounted in the blade holder, one end of the head being spaced from the blade holder, a plate swiveled on the extension and confined in the space between the head and the blade holder, said plate having ears, a handle member having spaced apart ears in registry with and pivoted to the ears on the plate, the handle member having a threaded opening, a screw extending through the threaded opening and engaging the semi-spherical head to lock the blade holder and the handle member together.

6. A safety razor comprising a blade holder, a semi-spherical head having a reduced extension which is mounted in the blade holder, one end of the head being spaced from the blade holder, a plate swiveled on the extension and confined in the space between the head and the blade holder, said plate having ears, a handle member having spaced apart ears in registry with and pivoted to the ears on the plate, the handle member having a threaded opening, a screw extending through the threaded opening and the end of the screw being pointed and engaging in one of a plurality of indentations formed in the surface of the semi-spherical head to lock the blade holder and the handle member together.

7. A safety razor comprising a blade holder, a swivel, a head mounted on the blade holder to confine the swivel, a handle member pivoted to the swivel, and a screw operating in the handle member, whereby when the screw is adjusted toward the head the handle member is moved away from the blade holder and the swivel, head and handle member are locked in adjusted position.

In testimony whereof I have signed my name to this specification in the presence of two subscribing witnesses.

JAMES D. GOODWIN.

Witnesses:
F. M. MEYER,
M. E. MCCURDY.

Copies of this patent may be obtained for five cents each, by addressing the "Commissioner of Patents, Washington, D. C."